United States Patent
Desai et al.

(10) Patent No.: US 11,837,062 B2
(45) Date of Patent: Dec. 5, 2023

(54) ELECTRONIC DEVICE THAT PAUSES MEDIA PLAYBACK BASED ON EXTERNAL INTERRUPTION CONTEXT

(71) Applicant: MOTOROLA MOBILITY LLC, Wilmington, DE (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/410,243

(22) Filed: Aug. 24, 2021

(65) Prior Publication Data

US 2023/0062414 A1 Mar. 2, 2023

(51) Int. Cl.
| | | |
|---|---|---|
| G08B 25/00 | (2006.01) | |
| G08B 13/196 | (2006.01) | |
| G08B 21/22 | (2006.01) | |
| G06F 3/16 | (2006.01) | |
| G08B 21/04 | (2006.01) | |

(52) U.S. Cl.
CPC ......... *G08B 13/19691* (2013.01); *G06F 3/16* (2013.01); *G08B 21/0461* (2013.01); *G08B 21/22* (2013.01)

(58) Field of Classification Search
USPC .............. 340/524, 525, 538, 539.12, 539.21, 340/539.23, 539.25, 546, 555, 574–575, 340/588
See application file for complete search history.

(56) References Cited

U.S. PATENT DOCUMENTS

| | | |
|---|---|---|
| 6,968,565 B1 | 11/2005 | Slaney et al. |
| 8,645,985 B2 | 2/2014 | Deshpande et al. |
| 8,914,818 B2 | 12/2014 | Weast et al. |
| 10,194,204 B1 | 1/2019 | Don et al. |
| 10,708,653 B1 | 7/2020 | Stinson et al. |

(Continued)

FOREIGN PATENT DOCUMENTS

| | | |
|---|---|---|
| TR | 201610746 A2 | 2/2017 |
| WO | 0237474 A1 | 5/2002 |

(Continued)

*Primary Examiner* — Daniel Previl
(74) *Attorney, Agent, or Firm* — Isidore PLLC

(57) ABSTRACT

An electronic device, computer program product, and method manage presenting and pausing of media content in response to remotely detected interruptions. The electronic device includes network interface(s) by which the electronic device communicatively connects to: (i) a media output device that presents media content; and (ii) external device(s) that is configured to detect an event that draws user attention. A controller of the electronic device is communicatively coupled to the at least one network interface and a user interface device. The controller presents, via one or more signals transmitted via the network interface(s), media content presented on the media output device. The controller monitors the external device(s). In response to receiving input indicating that at least one external device has detected an event, the controller pauses the presentation of the media content on the media output device and presents, on a user interface device, a notification of the event.

20 Claims, 7 Drawing Sheets

(56) References Cited

U.S. PATENT DOCUMENTS

| | | |
|---|---|---|
| 2003/0095522 A1* | 5/2003 | Korus .................. H04L 12/18 |
| | | 370/352 |
| 2003/0097659 A1* | 5/2003 | Goldman ............. H04N 21/442 |
| | | 725/89 |
| 2003/0147624 A1 | 8/2003 | Trajkovic et al. |
| 2007/0061851 A1 | 3/2007 | Deshpande et al. |
| 2007/0192486 A1 | 8/2007 | Wilson et al. |
| 2007/0260517 A1 | 11/2007 | Zalewski et al. |
| 2011/0069940 A1 | 3/2011 | Shimy et al. |
| 2011/0162018 A1 | 6/2011 | Dodd |
| 2014/0150002 A1 | 5/2014 | Hough et al. |
| 2016/0057497 A1 | 2/2016 | Kim et al. |
| 2016/0198229 A1 | 7/2016 | Keipert |
| 2016/0248766 A1 | 8/2016 | Tembey et al. |
| 2016/0261915 A1 | 9/2016 | Niebres et al. |
| 2017/0068311 A1* | 3/2017 | Evans .................. G09G 3/002 |
| 2017/0332140 A1 | 11/2017 | Blake et al. |
| 2019/0238366 A1* | 8/2019 | Conner .................. H04L 43/50 |
| 2020/0201495 A1 | 6/2020 | Coffman et al. |
| 2020/0221176 A1 | 7/2020 | Hwang et al. |
| 2020/0236152 A1 | 7/2020 | Bradley et al. |
| 2020/0275151 A1* | 8/2020 | Xiong .............. H04N 21/44218 |
| 2020/0296468 A1* | 9/2020 | Wittke ............... H04N 21/4751 |
| 2020/0296469 A1 | 9/2020 | Wittke |
| 2021/0120204 A1 | 4/2021 | Senapati |
| 2021/0120300 A1* | 4/2021 | Arling ................ H04N 21/4126 |
| 2021/0136447 A1 | 5/2021 | Daw et al. |
| 2021/0158836 A1 | 5/2021 | Iwase et al. |
| 2021/0225465 A1* | 7/2021 | Nallaperumal ........ G16H 10/60 |
| 2022/0015062 A1 | 1/2022 | Carey |

FOREIGN PATENT DOCUMENTS

| | | |
|---|---|---|
| WO | 2019195112 A1 | 10/2019 |
| WO | 2020219763 A1 | 10/2020 |

* cited by examiner

ELECTRONIC DEVICE THAT PAUSES MEDIA PLAYBACK BASED ON EXTERNAL INTERRUPTION CONTEXT

BACKGROUND

1. Technical Field

The present disclosure relates generally to electronic devices having a user interface control for an external device, and more particularly to electronic devices having the user interface control that supports presenting media on a media output device.

2. Description of the Related Art

User communication devices such as mobile phones, desktop workstations, laptops, and tablets are often equipped with sensors, such as a camera and a microphone to enable human interaction. Microphones and cameras can also be incorporated as peripheral devices. Initially intended to support voice and later video communication sessions, these sensors have been used for an increasing number of purposes. The user communication devices are connectable to a number of external devices that provide and/or that can play audio and video media content. Given the ubiquity of user communication devices such as smart phones, recent innovations can utilize the user interface and connectivity of the user communication device to control playing of media content at external media output devices, such as display monitors and speakers.

Although these capabilities are a significant improvement over traditional entertainment and informational media systems of past decades, certain unavoidable inconveniences continue to exist for a user who is consuming the media content. The versatility of electronic devices enables receiving alerts from a number of remote devices, such as door monitors, security monitors, communication systems, household appliances, etc. Certain interruption events are urgent and require immediate attention from the user, while certain other interruption events are not urgent and do not require immediate attention from the user. Responding to interruption events occurring on the communication device while the media content continues to play on the media output device degrades the user experience as the user may find it difficult to find the right location of the media content from before the received interruption for restarting playing of the media content. Also, the user experience can also be degraded by an automatic pause to playing of the media content in response to a non-urgent interruption.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
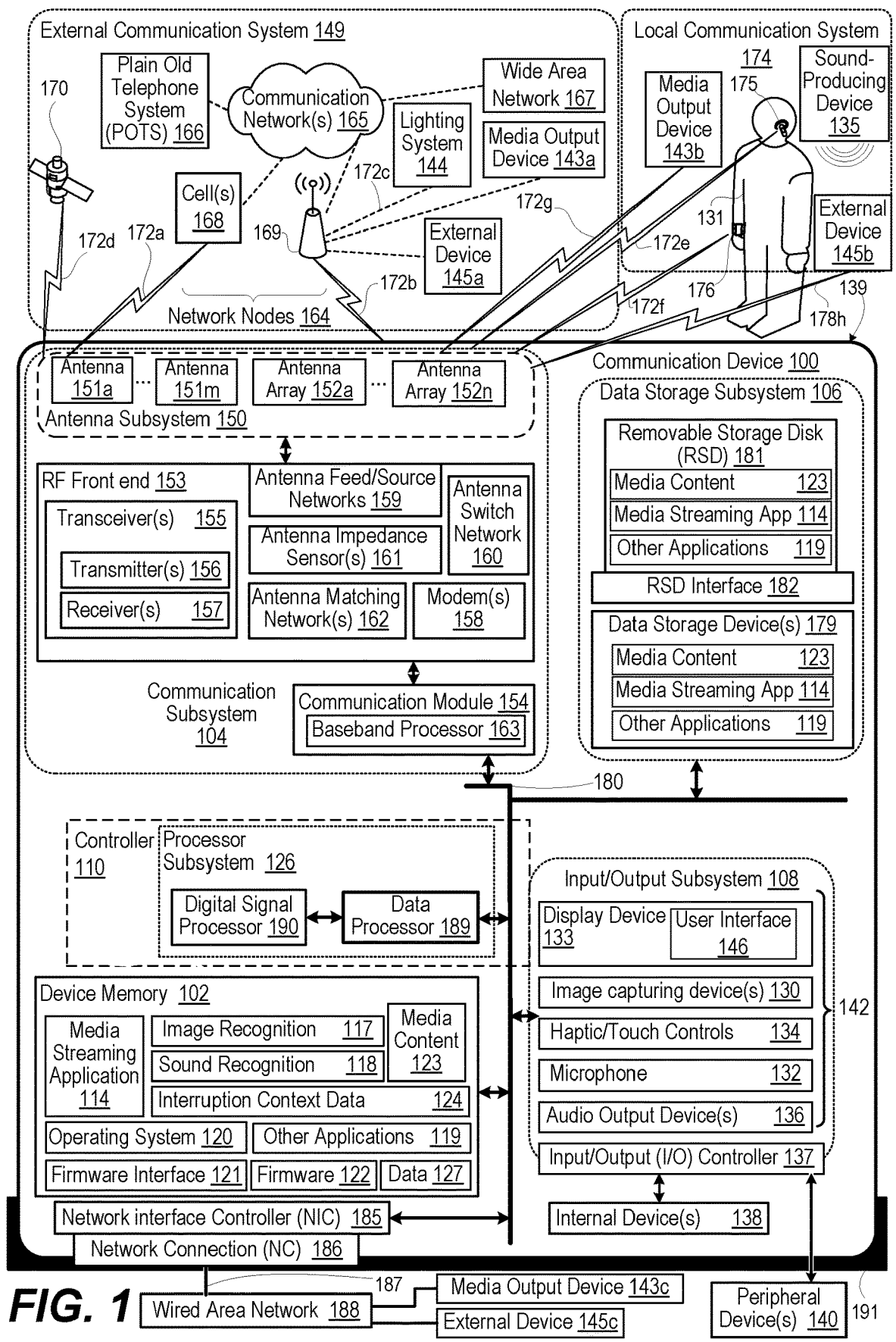
FIG. 1 depicts a functional block diagram of a communication environment of a communication device that manages presenting and pausing of media content in response to remotely detected interruptions, and within which the features of the present disclosure are advantageously implemented, according to one or more embodiments.

According to aspects of the present disclosure, an electronic device, a computer program product, and a method manage presenting and pausing of media content in response to remotely detected interruption events that are identified as urgent. The electronic device includes at least one network interface by which the electronic device communicatively connects to: (i) a media output device that presents media content; and (ii) at least one external device that is configured to detect an interruption event that draws user attention. A controller of the electronic device is communicatively coupled to the at least one network interface and a user interface device. The controller presents, via one or more signals transmitted via the at least one network interface, media content presented on the media output device. The controller monitors the at least one external device via the at least one network interface. In response to receiving input indicating that the at least one external device has detected an interruption event, the controller pauses the presentation of the media content on the media output device via the at least one network interface and presents, on the user interface device, a notification of the interruption event from the at least one external device. The pausing of the presenting of the media content is autonomous, without any input from the consumer.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an operating environment having a functional block diagram of an electronic device, specifically communication device 100, within which several of the features of the present disclosure are advantageously implemented. Referring now to the specific component makeup and the associated functionality of communication device 100 of FIG. 1. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as media streaming application 114, image recognition utility 117, sound recognition utility 118, and other application(s) 119. Device memory 102 further includes operating system (OS) 120, firmware interface 121, such as basic input/output system (BIOS) or Uniform Extensible Firmware Interface (UEFI), and firmware 122. Device memory 102 can include media content 123 and interruption context data 124 used by media streaming application 114.

Controller 110 includes processor subsystem 126 that executes program code to provide operating functionality of communication device 100. The software and/or firmware modules have varying functionality when their corresponding program code is executed by processor subsystem 126 or secondary processing devices within communication device 100. Processor subsystem 126 of controller 110 can execute program code of media streaming application 114 and other applications 119 to configure communication device 100 to perform specific functions.

I/O subsystem 108 includes user interface components such as image capturing device 130, microphone 132, display device 133, touch/haptic controls 134, and audio output device(s) 136. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to at least one image capturing device 130 and to at least one user interface device 142 that includes at least one microphone 132. Image capturing device 130 can detect whether consumer 131 is positioned with a monitored area to consume a visual portion of media content 123. Image capturing device 130 can detect whether consumer 131 is positioned proximate to one or more media output device(s) 143a-143c, blocking the visual portion of media content 123 from a field of view of another consumer 131. Microphone 132 can detect a voice of consumer 131 and an aural alarm from sound-producing device 135, such as a household appliance. Microphone 132 can detect other contextual sounds associated with an interruption. Controller 110 manages presenting and pausing of media content 123 at one or more media output devices 143a-143c. In particular, controller 110 pauses one or more media output devices 143a-143c in response to remotely detected interruption events detected by at least one external device 145a-c. In one or more embodiments, communication device 100 is communicatively coupled to media output device 143 a-143c using device interface 211 that can support one or more of: (i) wireless protocols 212; (ii) wired protocols 213; and (iii) radio access protocols 214 (FIG. 2) described below. In an example, device interface 211 (FIG. 2) supports wireless communication. In another example, the device interface is a wired connection to media output device 143 a-143c. In one embodiment, controller 110 can also be communicatively coupled to lighting system 144 to adjust lighting in support of presenting media content 123 at media output device 143 a-143c. In one or more embodiments, controller 110 executes program code such as media streaming application 114 (stored in a computer readable storage device, such as device memory 102) to control presenting and pausing of media content 123 at media output device 143 a-143c. Controller 110 determines, using one or more sensors, such as at least one image capturing device 130 and at least one microphone 132, that a consumer 131 is in a monitored area during the presenting of the media content 123. Controller 110 further monitors input received from the one or more remote sensors to determine whether an urgent interruption event has occurred and/or is occurring. An interruption can degrade consumer experience relative to the presenting of media content 123. In response to determining that the interruption has occurred and/or is occurring, controller 110 pauses the presenting of media content 123 at media output device 143 *a*-143*c*. In one or more embodiments, controller 110 ignores non-urgent interruption events, which are interruption events that could also degrade the user experience by unnecessarily pausing the presentation of media content 123.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100*a* in place of 100).

Referring now to the communication components and features of communication device 100. Communication subsystem 104 of communication device 100 enables wireless communication with external communication system 149. Communication subsystem 104 includes antenna subsystem 150 having lower band antennas 151*a*-151*m* and higher band antenna arrays 152*a*-152*n* that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulates baseband encoded data from communication module 154 onto a carrier signal to provide a transmit signal that is amplified by transmitter(s) 156. Modem(s) 158 demodulates each signal received by antenna subsystem 150 from external communication system 149. The received signal is amplified and filtered by receiver(s) 157, which demodulates received encoded data from a received carrier signal. Antenna feed/source networks 159 transmits or receives data from particular portions of antenna subsystem 150 and can adjust a phase between particular portions of antenna subsystem 150. Antenna switch network 160 can connect particular combinations of antennas (151*a*-151*m*, 152*a*-152*n*) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151*a*-151*m* to tune impedance respectively of lower band antennas 151*a*-151*m* to match impedance of transceivers 155. Antenna matching network(s) 162 can also be used to detune the impedance of lower band antennas 151*a*-151*m* to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 149. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151*a*-151*m* are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172*a* with base stations 168. Communication subsystem 104 communicates via wireless communication channel(s) 172*b* with access node 169. In one or more particular embodiments, access node 169 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 104 communicates with one or more locally networked devices via wired or wireless link 172*c* provided by access node 169. Examples of locally networked devices include lighting system 144, media output devices 143*a*, and external devices 145*a* that communicate notifications to communication device 100. Communication subsystem 104 receives downlink broadcast channel(s) 172*d* from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172*e* with headset 175. Communication subsystem 104 communicates via second low power wireless communication channel(s) 172*g*, such as Bluetooth, with media output device 143*b*. Communication subsystem 104 communicates via second low power wireless communication channel(s) 172*f*, such as Bluetooth, with smart watch 176. In one or more particular embodiments, communication subsystem 104 communicates with external device 145*b* via wireless link 172*h* to form an ad hoc network or other local wireless network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as media streaming application 114 and other application(s) 119 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for media streaming application 114 and other applications 119. When executed by controller 110, the program code causes or configures communication device 100 to improve a user experience described herein.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Media output device 143*c* and external device 145*c* are presented communicatively couple to wired area network 188. In an example, communication device 100 is positioned in dock 191. Dock 191 can provide a charging power source and a communication connection to media output device 143.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 126, which includes one or more central processing units (CPUs), depicted as data processor 189. Processor subsystem 126 can include one or more digital signal processors 190 that are integrated with data processor 189 or are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Figure 2:
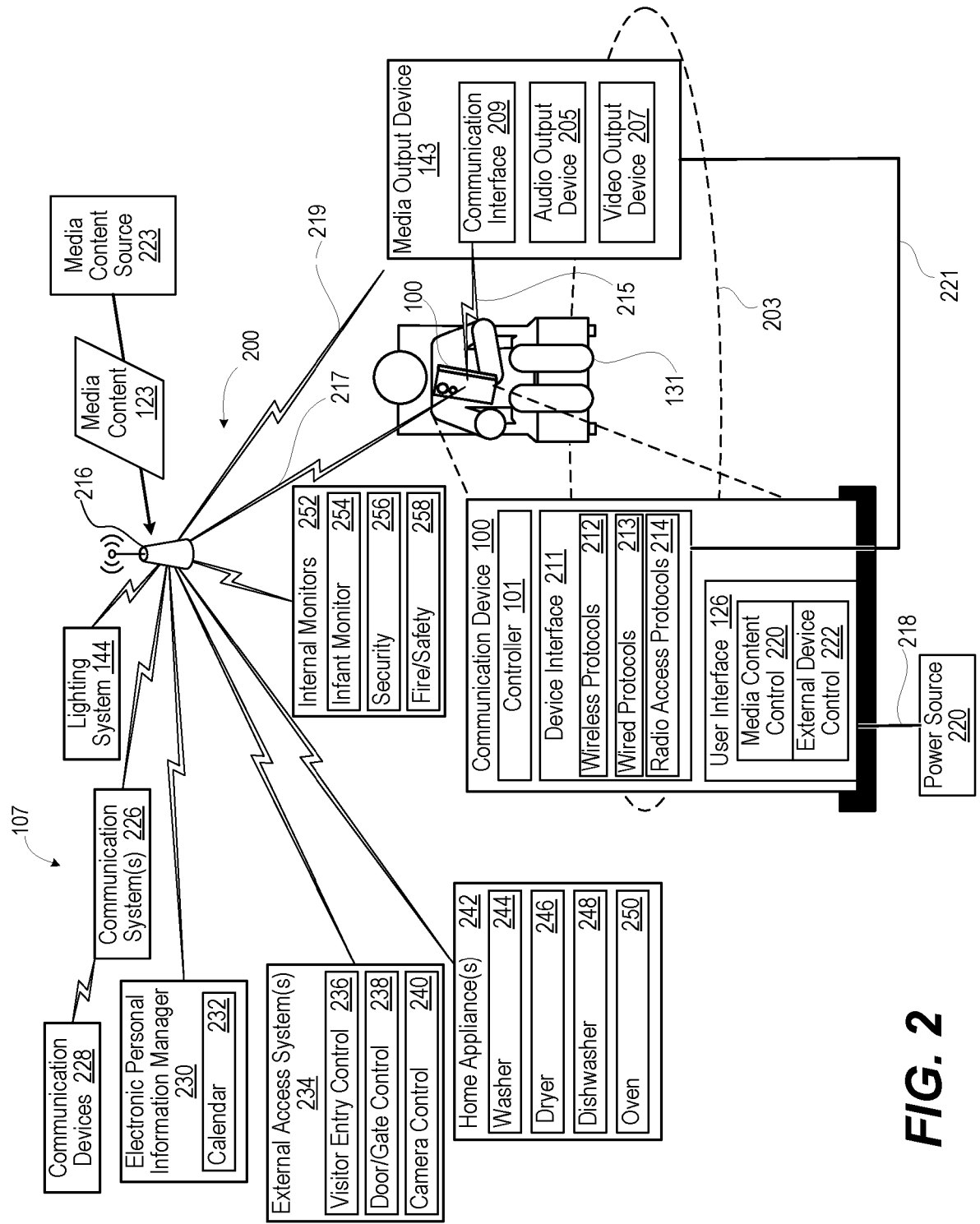
FIG. 2 depicts a communication system of the communication device of FIG. 1 wirelessly connected to and wirelessly controlling a media output device, according to one or more embodiments.

FIG. 2 depicts communication system 200 with communication device 100 includes device interface 201 that monitors external devices for interruption context. Consumer 131 is in monitored space 203 experiencing presentation of media content 123 at media output device 143. In an example, media content 123 includes an audio portion that is presented by audio output device 205. In another example, media content 123 includes a visual portion (e.g., video, images) that is presented by video output device 207. Media content 123 can be read from storage media (e.g., optical disc, RSD, etc.) by media output device 143 or received at communication interface 209. User interface 126 presents media content control 220 to interact with media output device 143 and external device control 222 to interact with external devices 145. As an example of external devices 145, lighting system 144 can dim or brighten illumination of monitored space 203 in which consumer 131 experiences presentation of media content 123 at media output device 143. As another example of external devices 145, communication system 226 supports a population of communication devices 228 that can respectively initiate a communication session with communication device 100, which can be an interruption event that draws attention of consumer 131. In an additional example of external devices 145, electronic personal information manager 230 can maintain calendar 232 that includes interruption events for consumer 131. Notifications for interruption events can draw the attention of consumer 131.

In yet another example of external devices 145, external access systems 234 such as visitor entry control 236, door/gate control 238, and security camera control 240 can be used to selectively allow entry or generate an alert. Certain visitors to a controlled area can be recognized and provided access or provide a required input of an access code that allows entry. Consumer 131 may want to know when such visitors are accessing a door or gate. Certain visitors may require authorization from consumer 131 upon arrival at a gate or door. Consumer 131 may choose to be notified when all visitors approach, when only an invited/expected/pre-approved visitor approaches, or when certain uninvited or unwanted visitors approach.

In yet an additional example of external devices 145, home appliance 242 such washer 244, dryer 246, dishwasher 248 or oven 250 can generate interruption event notifications, some of which may be deemed urgent to the user/owner of communication device 100 who is consuming media content presented on media output device 143. Washer 244 can become in-balanced, requiring rearrangement of wet clothing. Completion of a drying cycle of dryer 246 can draw attention of consumer 131 to remove still warm laundry before wrinkles set in. Timer of oven 250 can indicate that food needs to be removed prior to being overcooked.

In a further example of external devices 145, internal monitors 252 such as infant monitors 254, security monitors 256, and fire/safety monitors 258 can generate urgent interruption event notifications. Infant monitor 254 can detect images, sounds, or motion by an infant that would prompt intervention by consumer 131. Security monitors 256 can be triggered by images, sounds, motion, mechanism changes, etc. Fire/safety monitors 258 can be chemically triggered by presence of heat, smoke, or toxic gases.

In one or more embodiments, communication device 100 can stream media content 123 (FIG. 2) to media output device 143 or otherwise control presentation of media content 123 via media output device 143. In response to the interruption context reported by at least one external device 145, controller 110 of communication device 100 can pause presenting of media content 123 by media output device 143. In one or more embodiments, communication device 100 is communicatively coupled by device interface 211 to communication interface 209 at media output device 143. In an example, device interface 211 supports a direct wireless communication channel 215. In another example, device interface 211 wirelessly connects to access point 216 via wireless communication channel 217. Access point 216 is also wirelessly connected to communication interface 209 at media output device 143 via wireless communication channel 219. In an additional example, dock 191 provides power connection 218 for connecting communication device 100 to power source 220. Dock 191 provides wired communication connection 221 for communicatively connecting device interface 211 of communication device 100 to communication interface 209 of media output device 143. Access point 216 can provide media content 123 received from network media source 223. Media content 123 can also be stored at communication device 100 or at storage associated with media output device 143.

Figure 3:
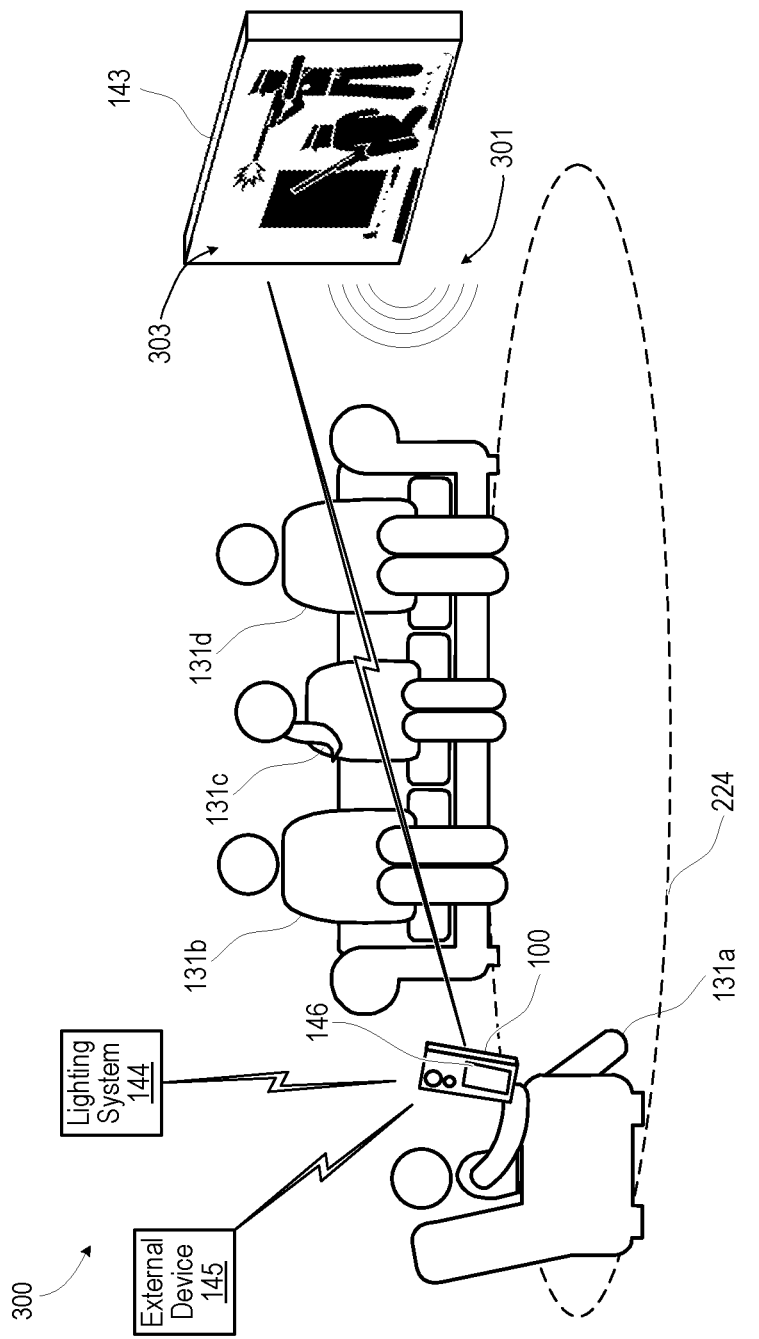
FIG. 3 depicts a viewing environment that includes the communication system of FIG. 2 during presenting of the media content by the media output device, according to one or more embodiments.

FIG. 3 depicts a viewing environment 300 in which audio output 301 and visual display 303 of media content 123 (FIG. 2) are being presented via media output device 143. Consumers 131a-131d are experiencing/consuming audio output 301 and visual display 303. Consumer 131a can use communication device 100 to select media content 123 (FIG. 2) or selection of media content 123 can be made using other components such as controls of media output device 143.

Figure 4:
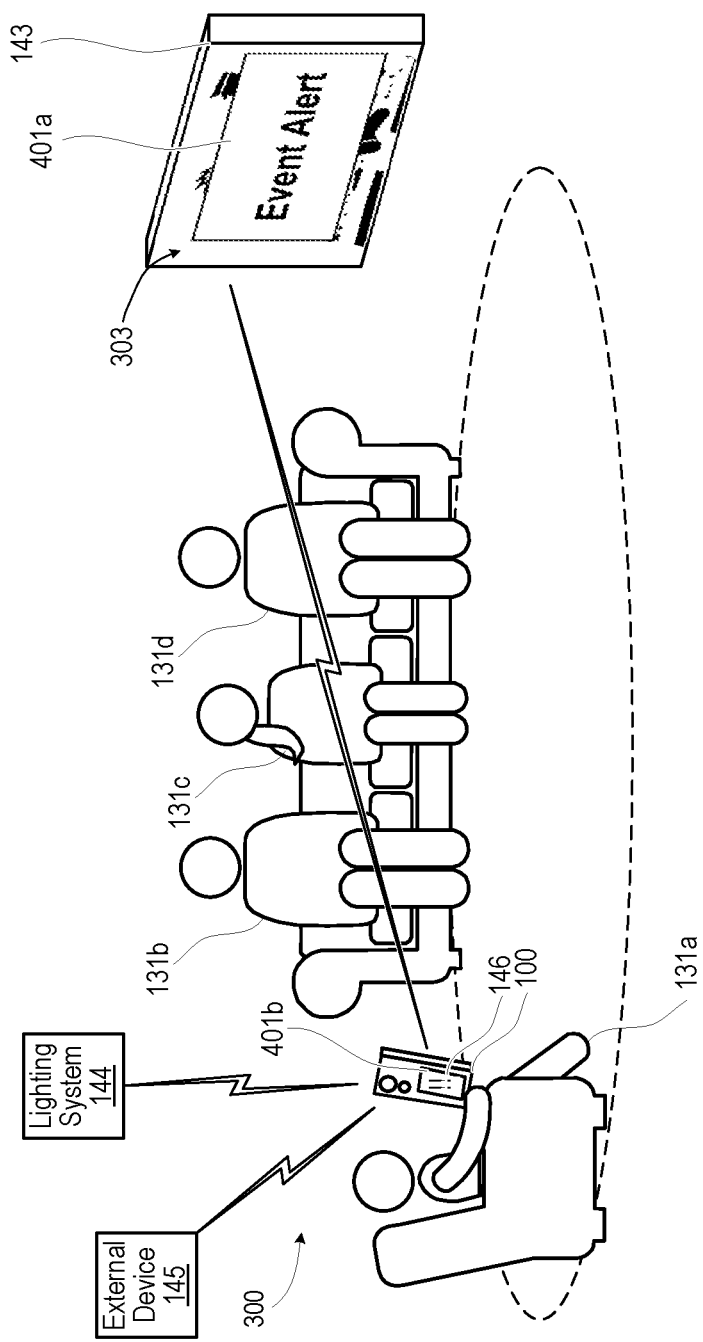
FIG. 4 depicts the viewing environment of FIG. 3 with the communication device presenting interruption event notifications and examples and pausing of presentation of the media content by the communication device in response to receiving an interruption event from an external device, according to one or more embodiments.

FIG. 4 depicts the viewing environment 300 with autonomous pausing presentation by communication device 100 of media content 123 on media output device 143 (FIG. 2) and with notifications 401a-401b presented respectively on media output device 143 and communication device 100. Communication device 100 responds to at least one interruption event received from external device 145, such as one or more of the particular interruption events described above in the description of FIG. 2. Communication device 100 can cause lighting system 144 to brighten when presentation of media content 123 is paused.

Figure 5:
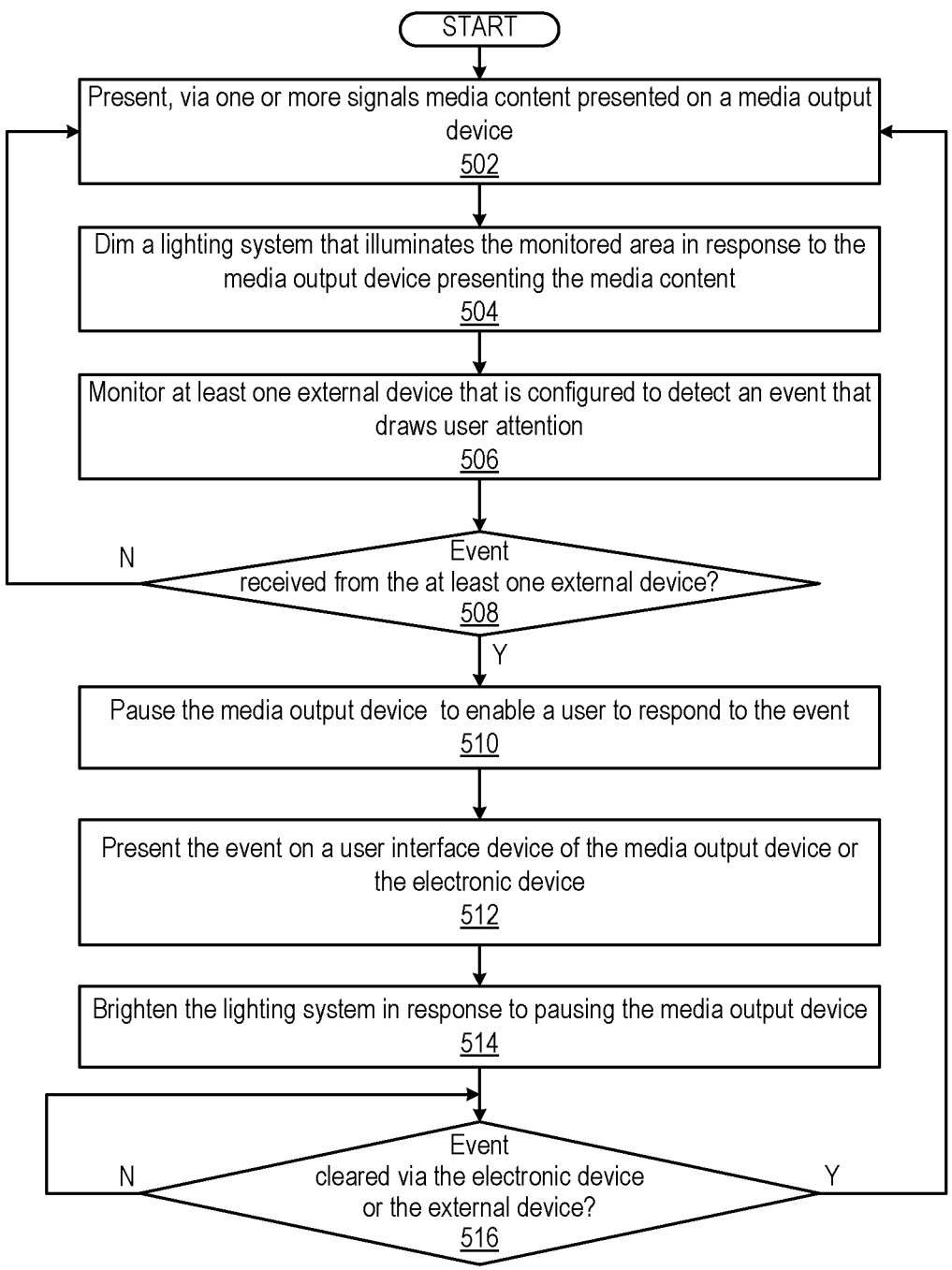
FIG. 5 presents a flow diagram of a method for pausing presentation of media content in response to remotely detected interruptions, according to one or more embodiments.

FIG. 5 presents a flow diagram of method 500 for presenting media content that is autonomously paused in response to receiving, by an electronic device, an urgent and important interruption event from an external device. and pausing presentation of media content in response to detected remote interruptions. In particular, method 500 manages control of media output device 143 via an electronic device such as communication device 100 (FIG. 1). In at least one embodiment, communication device 100, managed by controller 110, executes media streaming application 114 (FIG. 1) to manage presenting and pausing of media content in response to a remote interruption detected by external device 145 and identified by controller 110 (FIG. 1). The description of method 500 as well as the description of method 600 (FIG. 6) are provided with general reference to the specific components illustrated within the preceding FIGS. 1-4, and specific components referenced in methods 500 and 600 (FIG. 6) can be identical or similar to components of the same name used in describing preceding FIGS. 1-4. Method 500 includes causing, via one or more signals, media content to be presented on a media output device (block 502). Method 500 includes dimming a lighting system that illuminates the monitored area in response to the media output device presenting the media content (block 504). Method 500 includes monitoring, via the at least one network interface, at least one external device that is configured to detect an interruption event that may require/trigger user attention (block 506). Method 500 includes determining whether an interruption event is received from one of the at least one external devices (decision block 508). In response to determining that an interruption event from the at least one external device has not been received, method 500 returns to block 502. In response to determining that an interruption event detected or registered by the at least one external device has been received, method 500 includes pausing the media output device using the at least one network interface to enable a user to respond to the interruption event (block 510). Method 500 includes presenting, on a user interface device of the media output device and/or the electronic device, a notification of the interruption event from the at least one external device that may require user attention (block 512). Method 500 includes brightening the lighting system in response to pausing the media output device (block 514). Method 500 includes determining whether the interruption event is cleared via the electronic device or the at least one external device (decision block 516). The clearing of the interruption event may involve entry of a user input at the electronic device or the at least one external device. In response to determining that the interruption event is cleared via either the electronic device or the at least one external device, method 500 returns to block 502. In response to determining that the interruption event is not cleared via the electronic device or the at least one external device, method 500 returns to block 516.

In one or more embodiments, the at least one external device includes an access system positioned proximate to a door or gate and that has a motion detector and a user input control. The controller determines that the access system has detected an interruption event involving a presence of a person at the door or the gate. The detection can be based on one of: (i) triggering of the motion detector; and (ii) receiving a user input to the user input control. In one or more embodiments, the at least one external device includes a communication system. The controller determines that the communication session has detected an interruption event that is/includes a communication session request from a communication device connected to the communication system. In one or more embodiments, the at least one external device includes an electronic personal information manager that manages scheduled interruption events associated with the user of the electronic device. The controller determines that electronic personal information manager has detected an interruption event that includes an alarm of a calendar event scheduled to occur at or to generate an advanced notification at a current time. In one or more embodiments, the at least one external device includes a security system having one or more sensor(s) positioned to sense an intrusions into a secured location and report the intrusion as an interruption event. The controller determines that the security system has detected the intrusion event. In one or more embodiments, the at least one external device includes a baby monitor having at least one sensor positioned to sense activity of an infant. In one or more embodiments, the at least one external device includes a home appliance having at least one sensor that identifies when a manual intervention/input by a user is required for successful operation of the home appliance. In an example, an oven provides an alert that a timer has expired. In another example, a dryer provides an alert that a drying cycle has completed. In an additional example, a washer provides an alert of an imbalance that prevents a spin cycle.

Figure 6A:
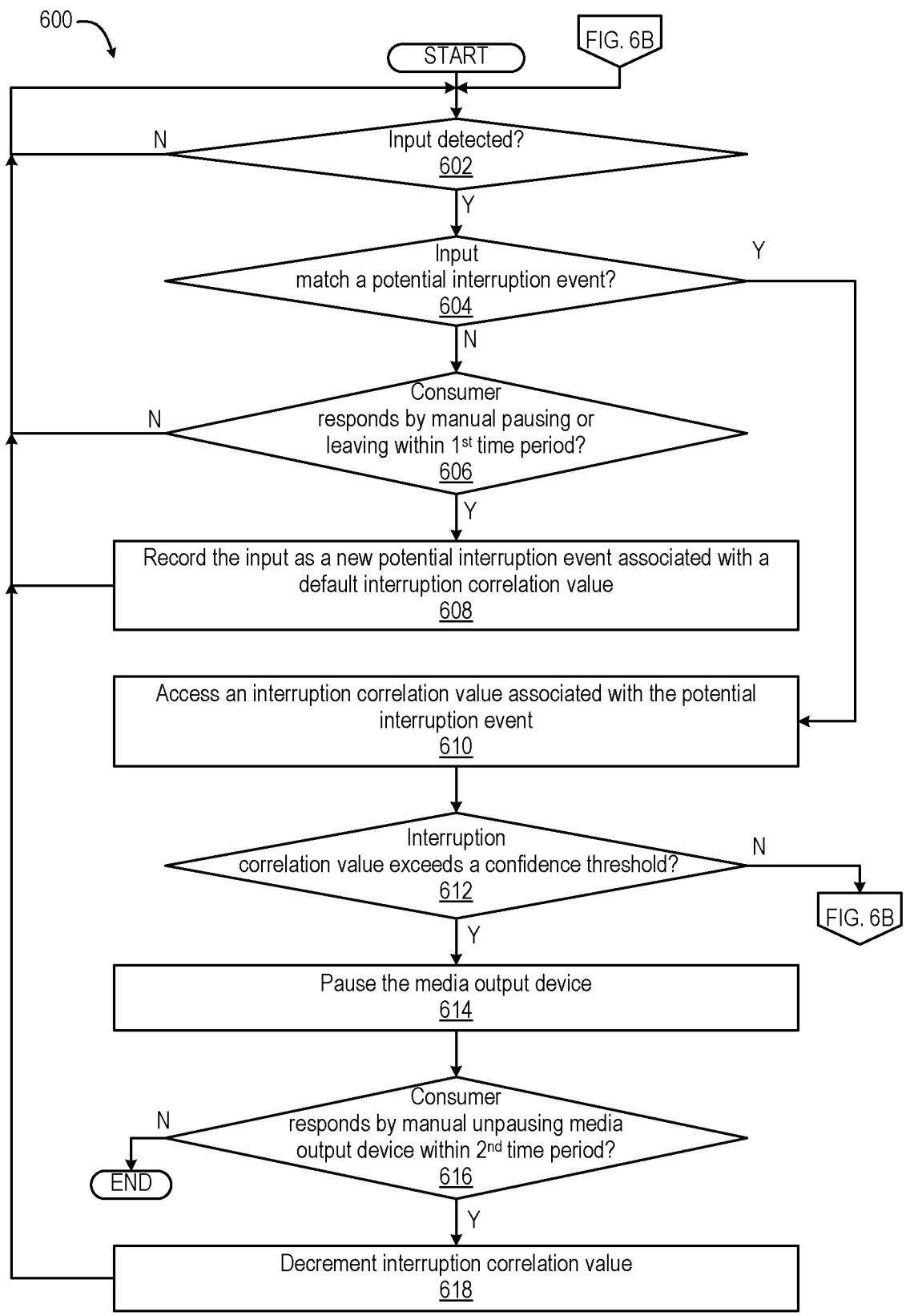
FIGS. 6A-6B (FIG. 6) present a flow diagram of a method for machine learning interruption events that are urgent interruptions requiring pausing of the output of media content, according to one or more embodiments.
Figure 6B:
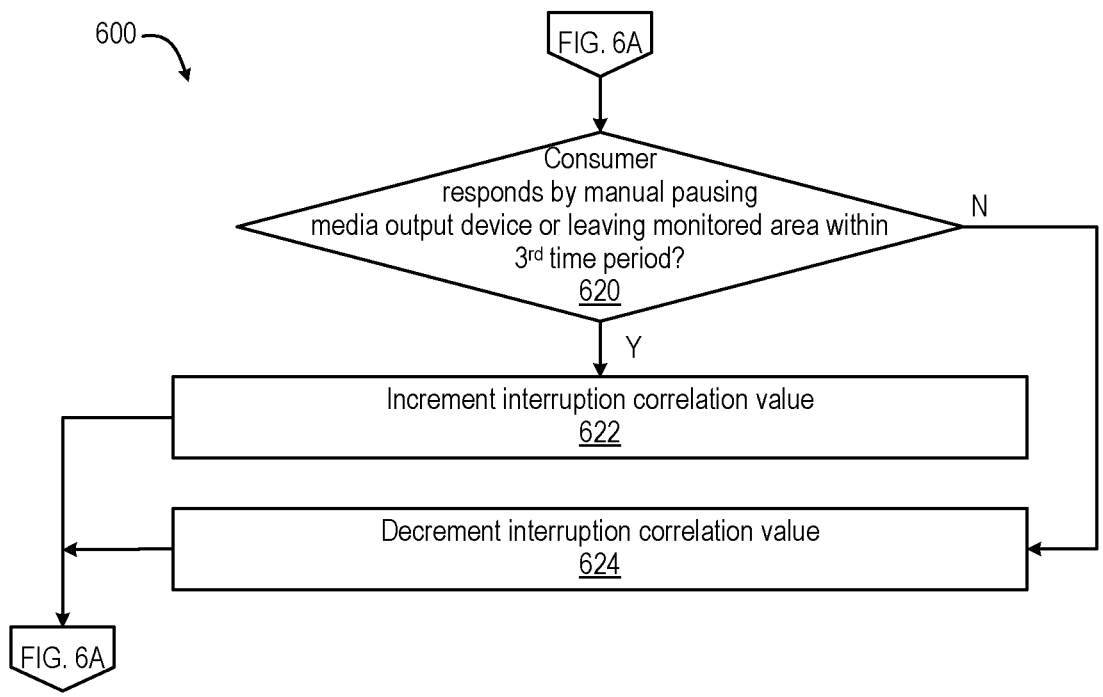

FIGS. 6A-6B (FIG. 6) present a flow diagram of method 600 for machine learning which interruption events identified by an external device are to be identified as urgent and important interruption events that should trigger pausing of presenting of media content. With reference to FIG. 6A, method 600 includes determining whether an input is detected by the one or external devices (block 602). In response to determining that an input is not occurring or has not occurred, method 600 returns to block 602. In response to determining that an input is indicated by an external device, method 606 includes determining whether the input is previously identified and recorded as a potential interruption event (decision block 604). In one or more embodiments, assessing whether a potential interruption event is an urgent and important interruption event that warrants pausing presentation of media content is in response to monitoring consumer response to both notification of the potential interruption event and any automatic pausing of the presentation. In response to determining that the input event matches a potential interruption, method 600 proceeds to block 610. In response to determining that the input does not match a potential interruption event, method 600 includes determining whether the consumer responds to a notification of the input that is new by either manually pausing a presentation of the media output device or leaving the monitored area within a first wait time period (decision block 606). In response to determining that the consumer responds to the input that is new, method 600 includes recording the input as a new potential interruption event associated with a default interruption correlation value (block 608). In an example, the default interruption correlation value can be set to be at or above the confidence threshold so that the next occurrence will result in pausing presentation of the media content. In another example, the default interruption correlation value can be set to be one, two, three or more decrements below the confidence threshold so that a corresponding number of occurrence have to occur with the consumer responding to the input before autonomous pausing of the presentation of the media content is enabled. Then method 600 returns to block 602. In response to determining that the consumer does not respond to the input, method 600 returns to block 602.

In response to determining that the input matches a potential interruption event, method 600 includes accessing an interruption correlation value associated with the potential interruption event (block 610). Method includes determining whether the interruption correlation value exceeds a confidence threshold that is associated with an urgent and/or important interruption event (decision block 612). In response to determining that the interruption correlation value does not exceed (e.g., is equal to or less than) the confidence threshold, method 600 proceeds to block 620. In response to determining that the interruption correlation value exceeds the confidence threshold, which indicates that the interruption is an urgent and important interruption event, method 600 includes pausing the media output device (block 614). Method 600 includes determining whether the consumer responds to the automatic pausing of the media content by manually unpausing the presentation of the media output device within a second wait time period (decision block 616). In response to determining that the consumer does not respond to the automatic pausing of the media content by manually unpausing the presentation of the media output device within the second wait time period, method 600 ends. Subsequent to automatic unpausing of the media can occur as described in method 500 (FIG. 5). In response to determining that the consumer responds to the automatic pausing of the media content by manually unpausing the presentation of the media output device within the second wait time period, then method 600 includes decrementing the interruption correlation value (block 618). Then method 600 returns to block 602.

In response to determining that the interruption correlation value does not exceed the confidence threshold in decision block 612, method 600 includes determining whether the consumer responds to the potential interruption event that does not trigger the automatic pausing of the media content by either manually pausing a presentation of the media output device or leaving the monitored area within a third wait time period following the potential interruption event (decision block 620). In response to determining that the consumer responds to the potential interruption event, method 600 includes incrementing the interruption correlation value (block 622). Then method 600 returns to block 602. In response to determining that the consumer does not respond to the potential interruption event, method 600 includes decrementing the interruption correlation value associated with that interruption event (block 624). Then method 600 returns to block 602.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one network interface by which the electronic device communicatively connects to: (i) a media output device that presents media content; and (ii) at least one external device that is configured to detect interruption events defined as sufficiently urgent and sufficiently important to warrant user attention;
   wherein the at least one external device comprises one or more of (i) an access system positioned proximate to an entry, the access system comprising at least one of a motion detector and a user input control; (ii) an electronic personal information manager that manages scheduled events that involve the user of the electronic device; (iii) a baby monitor having at least one sensor positioned to sense activity of an infant; and (iv) a home appliance having at least one sensor that identifies when a manual intervention/input by a user is required for successful operation of the home appliance, the home appliance not being a telephone; and
   a controller communicatively coupled to the at least one network interface and a user interface device, and which:
      causes, via one or more signals transmitted via the at least one network interface, media content to be presented on the media output device;
      monitors the at least one external device via the at least one network interface; and
      in response to receiving input indicating that the at least one external device has detected an event:
         identifies whether the event is an interruption event; and
         in response to the event being an interruption event:
            pauses the presentation of the media content on the media output device via the at least one network interface.

2. The electronic device of claim 1, wherein:
   the at least one external device comprises the access system; and
   the controller determines that the access system has detected a presence of a person at the entry by one of: (i) receiving a triggering of the motion detector; and (ii) receiving a user input at the user input control.

3. The electronic device of claim 2, wherein, subsequent to pausing the media output device, the controller:
   monitors the access system to determine whether the person is no longer present; and
   in response to determining that the person is no longer present, resumes presenting of the media content on the media output device.

4. The electronic device of claim 1, wherein:
   the at least one external device further comprises a communication system; and
   the event comprises a communication session request from a communication device connected to the communication system.

5. The electronic device of claim 1, wherein:
   the at least one external device comprises the electronic personal information manager; and
   the controller: receives, as the event, a notification from the electronic personal information manager of an event scheduled to occur at a current time; and provides a notification of the scheduled event via at least one of the electronic device and the media output device.

6. The electronic device of claim 1, wherein:
   the at least one network interface is communicatively coupled to a lighting system that illuminates the monitored area and selectively reduces lighting in the monitored area; and
   the controller:
      transmits first control signals via a device interface to dim the lighting system in response to the media output device presenting the media content; and
      transmits second control signals to increase an intensity of the lighting system in response to pausing the presenting of media content via the media output device.

7. The electronic device of claim 1, wherein:
   the at least one external device further comprises a security system having at least one sensor positioned to sense an intrusion into a secured location; and
   the controller determines, as the event, the intrusion detected by the security system.

8. The electronic device of claim 1, wherein the at least one external device comprises the baby monitor; and
   the controller determines, as the event, the activity sensed by the at least one sensor of the baby monitor.

9. The electronic device of claim 1, wherein the at least one external device comprises the home appliance.

10. The method of claim 1, wherein the at least one external device further comprises a lighting system that illuminates the monitored area and selectively reduces lighting in the monitored area, the method further comprising:
transmitting first control signals to dim the lighting system; and
transmitting second control signals to brighten the lighting system in response to pausing the presenting of media content via the media output device.

11. The device of claim 1, wherein further the controller presents, on a user interface device, a notification of the event from the at least one external device.

12. A method comprising:
presenting, via one or more signals transmitted via at least one network interface of an electronic device, media content presented on a media output device;
monitoring at least one external device, via at least one network interface, that is configured to detect an event that draws user attention, wherein the at least one external device comprises one or more of (i) an access system positioned proximate to an entry, the access system comprising at least one of a motion detector and a user input control; (ii) an electronic personal information manager that manages scheduled events that involve the user of the electronic device; (iii) a baby monitor having at least one sensor positioned to sense activity of an infant; and (iv) a home appliance having at least one sensor that identifies when a manual intervention/input by a user is required for successful operation of the home appliance, the home appliance not being a telephone; and
in response to receiving input indicating that the at least one external device has detected an event:
pausing the presentation of the media content on the media output device via the at least one network interface.

13. The method of claim 12, wherein the at least one external device comprises the access system, the method further comprising:
monitoring the access system; and
determining that the access system has detected the event of a presence of a person at the entry based on one of:
(i) receiving a triggering of the motion detector; and (ii) receiving a user input at the user input control.

14. The method of claim 13, further comprising:
subsequent to pausing the media output device:
monitoring the access system to determine whether the person is no longer present; and
in response to determining that the person is no longer present, resuming presenting of the media content on the media output device.

15. The method of claim 12, wherein the at least one external device further comprises a communication system, the method further comprising:
monitoring the communication system; and
determining that the communication session has detected the event of a communication session request from a communication device connected to the communication system.

16. The method of claim 12, wherein the at least one external device comprises the electronic personal information manager, the method further comprising:
monitoring the electronic personal information manager; and
receiving, as the event, a notification from the electronic personal information manager of an event scheduled to occur at a current time; and
providing an alarm of the scheduled event via at least one of the electronic device and the media output device.

17. The method of claim 12, wherein the at least one external device comprises a security system having at least one sensor positioned to sense an intrusion into a secured location, the method further comprising:
monitoring the security system; and
determining, as the event, an intrusion detected by the security system.

18. A computer program product comprising:
a computer readable storage device; and
program code on the computer readable storage device that when executed by a processor associated with an electronic device, the program code enables the electronic device to provide functionality of:
presenting, via one or more signals transmitted via at least one network interface of the electronic device, media content presented on a media output device;
monitoring at least one external device, via at least one network interface, that is configured to detect an event that draws user attention, wherein the at least one external device comprises one or more of (i) an access system positioned proximate to an entry, the access system comprising at least one of a motion detector and a user input control; (ii) an electronic personal information manager that manages scheduled events that involve the user of the electronic device; (iii) a baby monitor having at least one sensor positioned to sense activity of an infant; and (iv) a home appliance having at least one sensor that identifies when a manual intervention/input by a user is required for successful operation of the home appliance, the home appliance not being a telephone; and
in response to receiving input indicating that the at least one external device has detected an event:
pausing the presentation of the media content on the media output device via the at least one network interface.

19. The computer program product of claim 18, wherein the program code enables the electronic device to provide the functionality of:
monitoring the access system; and
determining that the access system has detected the event of a presence of a person at the entry based on one of:
(i) receiving a triggering of the motion detector; and (ii) receiving a user input at the user input control.

20. The computer program product of claim 19, wherein the program code enables the electronic device to provide the functionality of:
subsequent to pausing the media output device:
monitoring the access system to determine whether the person is no longer present; and
in response to determining that the person is no longer present, resuming presenting of the media output on the media output device.

* * * * *